United States Patent
Chiu et al.

(10) Patent No.: US 8,102,932 B2
(45) Date of Patent: Jan. 24, 2012

(54) METHOD AND APPARATUS FOR DE-MAPPING SYMBOL IN MULTI-INPUT MULTI-OUTPUT COMMUNICATION SYSTEM

(75) Inventors: Po-Lin Chiu, Tainan County (TW); Ren-Jr Chen, Taipei County (TW)

(73) Assignee: Industrial Technology Research Institute, Hsinchu (TW)

( * ) Notice: Subject to any disclaimer, the term of this patent is extended or adjusted under 35 U.S.C. 154(b) by 1125 days.

(21) Appl. No.: 11/864,936

(22) Filed: Sep. 29, 2007

(65) Prior Publication Data

US 2009/0003499 A1    Jan. 1, 2009

(30) Foreign Application Priority Data

Jun. 28, 2007    (TW) ................................ 96123517 A (51) Int. Cl.
*H04B 7/02* (2006.01)
(52) U.S. Cl. ........ 375/267; 375/260; 375/340; 375/346; 375/349; 375/299
(58) Field of Classification Search .................. 375/267, 375/260, 340, 346, 349, 299
See application file for complete search history.

(56) References Cited

U.S. PATENT DOCUMENTS

| | | | |
|---|---|---|---|
| 2004/0165684 A1* | 8/2004 | Ketchum et al. ............... | 375/343 |
| 2005/0141644 A1 | 6/2005 | Sadowsky | |
| 2005/0243943 A1 | 11/2005 | Stirling-Gallacher | |
| 2006/0209667 A1* | 9/2006 | Li ................................. | 370/203 |
| 2007/0036246 A1* | 2/2007 | Hammerschmidt .......... | 375/340 |
| 2007/0198719 A1* | 8/2007 | Su et al. ........................ | 709/226 |
| 2008/0043873 A1* | 2/2008 | Ariyavisitakul .............. | 375/267 |

FOREIGN PATENT DOCUMENTS

TW    200303672    9/2003

OTHER PUBLICATIONS

Article titled "An Improved MIMO Detector for High Data Rates Wireless Communications" authored by Guo et al., The 2004 IEEE Asia-Pacific Conference on Circuits and Systems, Dec. 6-9, 2004 (pp. 213-216).
Article titled "Reduced Complexity MMSE Detection for BLAST Architectures" authored by Bohnke et al, Globecom2003, vol. 4, (pp. 2258-2262).

(Continued)

*Primary Examiner* — Kabir A Timory
(74) *Attorney, Agent, or Firm* — Jianq Chyun IP Office (57) ABSTRACT

A method and an apparatus for de-mapping symbols in a Multi-Input Multi-Output (MIMO) system are provided. In the present invention, an estimated channel effect and a plurality of received data symbols are used to estimate a plurality of transmitted data symbols. A plurality of constellation points around an estimated value are selected as the detected values of the transmitted data symbol after the estimated value of one of the transmitted data symbols is calculated. Then, the detected values are used to calculate the detected values of remaining transmitted data symbols separately so as to obtain a plurality of detected value sets. Finally, a best one among the detected value sets is chosen as a result of de-mapping the received symbols. Therefore, only a few detected value sets are calculated and a better detected result is obtained, which possesses low complexity and high performance.

27 Claims, 6 Drawing Sheets

OTHER PUBLICATIONS

Article titled "V-BLAST: An Architecture for Realizing Very High Data Rates Over the Rich-Scattering Wireless Channel" authored by Wolniansky et al., 1998 IEEE, (pp. 295-300).

Article titled "VLSI Architecture for 4×4 16-QAM V-BLAST Decoder" authored by Sobhanmanesh et al., ISCAS 2006 (pp. 293-296).

"Office Action of Taiwan Counterpart Application", issued on Mar. 8, 2011, p. 1-p. 6, in which the listed references were cited.

Davis L. M., "Scaled and Decoupled Cholesky and QR Decompositions with Application to Spherical MIMO Detection," Wireless Communication and Networking, 2003 WCNC, IEEE, 2003, p. 326-331, Mar. 20, 2003.

* cited by examiner

| Method \ Times | Complex Multiplications | Complex Divisions | Complex Additions | Real Additions |
|---|---|---|---|---|
| V-BLAST | 976 | 64 | 588 | 27 |
| QR-SIC | 222 | 4 | 98 | 12 |
| Improved Process | 308 | 16 | 156 | 24 |

FIG. 9

METHOD AND APPARATUS FOR DE-MAPPING SYMBOL IN MULTI-INPUT MULTI-OUTPUT COMMUNICATION SYSTEM

CROSS-REFERENCE TO RELATED APPLICATION

This application claims the priority benefit of Taiwan application serial no. 96123517, filed Jun. 28, 2007. All disclosure of the Taiwan application is incorporated herein by reference.

BACKGROUND OF THE INVENTION

1. Field of the Invention

The present invention relates to a method and apparatus for de-mapping symbols, and more particularly to a method and apparatus for de-mapping symbols in a Multi-Input Multi-Output (MIMO) communication system.

2. Description of Related Art

As people's requirements for the wireless communication services have become increasingly high, the current wireless communication system has a trend of having a high data rate and a high link quality. In order to effectively increase the data transmission rate and the link quality under limited bandwidth, a wireless communication system using a plurality of antennae is developed, for example, Multi-Input Multi-Output (MIMO) communication system (briefly referred to as MIMO system). Both the transmitting end and receiving end of the MIMO system utilize a plurality of antennae for data transmission, which not only enables the data to be transmitted in multiple paths and increases the data transmission volume, but also prolongs the transmission distance for the data, and thus the MIMO system has become one of the main wireless communication systems nowadays. The Bell-labs Layered Space Time (BLAST) communication technique developed by Bell labs of Lucent Technologies in USA is the most representative one.

Figure 1:
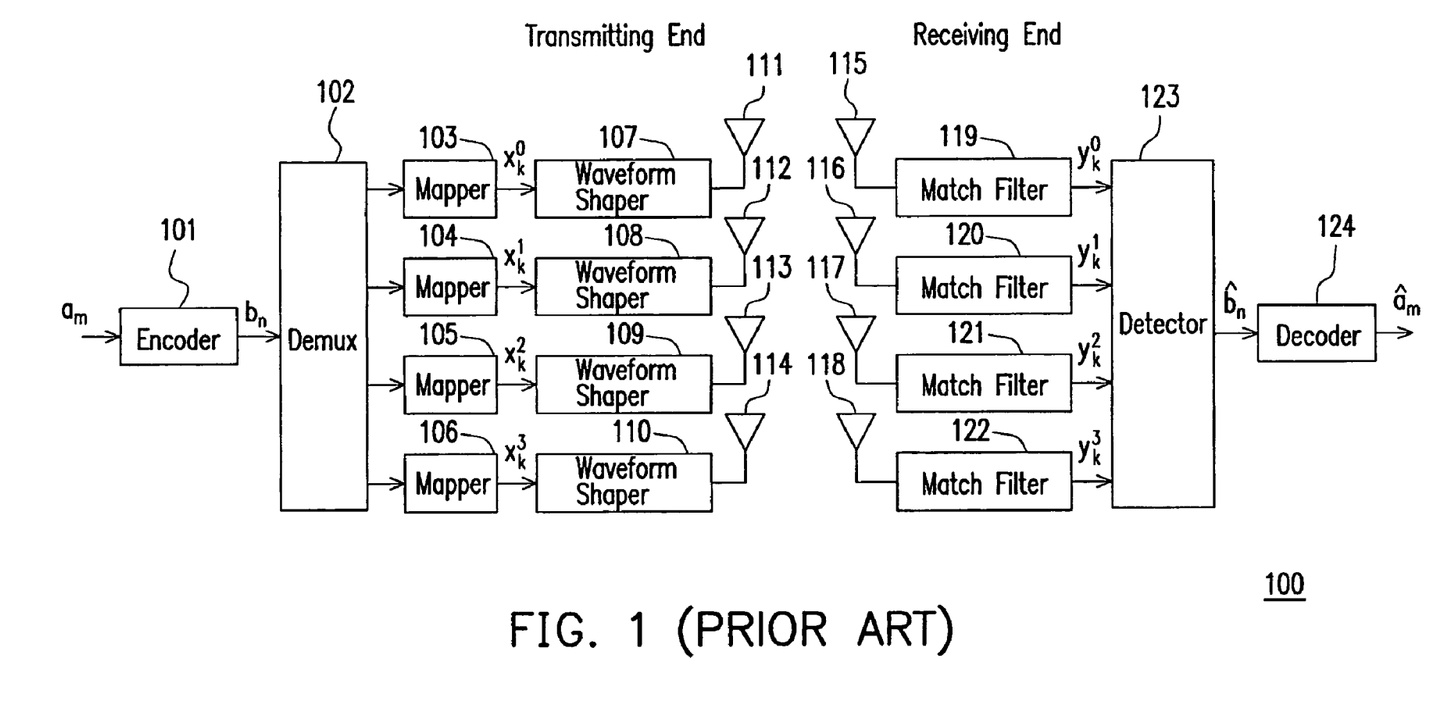
FIG. 1 is a block diagram of a conventional 4×4 MIMO communication system

In the MIMO system, the data received by the receiving end is the data formed by mixing the data transmitted from the transmitting end via the channel effect. For example, FIG. 1 is a block diagram of a conventional 4×4 MIMO communication system. Referring to FIG. 1, the transmitting end of the communication system 100 includes an encoder 101, a demultiplex (DEMUX) 102, mappers 103-106, waveform shapers 107-110 and transmitting antennas 111-114. The receiving end includes receiving antennas 115-118, match filters 119-122, a detector 123 and a decoder 124.

In the transmitting end, the encoder 101 is used to encode a data bit stream $a_m$ into a serial bit stream $b_n$. The DEMUX 102 is used to decompose the serial bit stream $b_n$ into a plurality of sub bit streams for being transmitted respectively via the transmitting antennas 111-114 subsequently. The mappers 103-106 are used to modulate each of the sub bit streams into a data symbol $x_k^0, x_k^1, x_k^2, x_k^3$, and then, after the signals are respectively shaped via the corresponding waveform shapers 107-110, the signals are transmitted to the receiving end via the corresponding transmitting antennas 111-114 respectively.

In the other aspect, in the receiving end, the receiving antennas 115-118 are used to receive data symbols transmitted via wireless channels. The match filters 119-122 are used to distinguish the signals into $y_k^0, y_k^1, y_k^2, y_k^3$. The detector 123 is used to estimate the data symbols originally transmitted via the transmitting antennas 111-114 according to the received data symbols, and estimate the serial bit stream $\hat{b}_n$ accordingly. The decoder 124 is used to decode the estimated serial bit stream $\hat{b}_n$ back to the data bit stream $\hat{a}_m$. After the data symbols transmitted via the transmitting antennas 111-114 having been estimated, but before being decoded by the decoder 124, a soft value must be calculated for the decoder 124 in order to perform the better decoding process.

To sum up, since the data symbols $(y_k^0, y_k^1, y_k^2, y_k^3)$ received by the receiving antennas 115-118 are results formed by mixing all the transmitted data symbols $(x_k^0, x_k^1, x_k^2, x_k^3)$ via the channel effect, the receiving end must estimate the data symbols transmitted from each of the transmitting antennas 111-114 of the transmitting end from the received data symbols, thereby de-mapping the received data symbols, in this way, the receiving end can perform the subsequent data calculation processes.

In the conventional detection mechanism, Maximum Likelihood (ML) algorithm is an ideal mechanism. However, the ML algorithm must search all the possibilities, such that the calculation is excessively complicated. Taking the 4×4 (the number of the receiving antennas×the number of the transmitting antennas), 16 Quadrature Amplitude Modulation (QAM) system for an example, there are totally $(16^4)$ possibilities, such that the ML algorithm is actually difficult to be achieved in the actual application. In order to cater to the actual application, other detection mechanisms are developed, such as Zero Forcing (ZF) algorithm, Minimum Mean Square Error (MMSE) algorithm, and Vertical BLAST (V-BLAST) algorithm.

The ZF algorithm and the MMSE algorithm belong to linear detection methods, which mainly aim at finding out an inverse channel for the channel effect, and then estimate the data symbols transmitted via each transmitting antenna by eliminating the channel effect merely through simple calculation. The V-BLAST algorithm belongs to an iterative detection method, which finds out a nulling vector, multiplies the nulling vector by the received signals as the estimated result, and then, removes the effects caused by the estimated result from the received signals to serve as the new received signals. Such calculations are repeated in several steps, until all the results are estimated.

In view of the above, although the V-BLAST algorithm has a better performance than that of the ZF algorithm or the MMSE algorithm, it has more complicated calculations, especially inverse matrix calculation must be performed during the calculations, and it must be calculated for each iteration. When the number of the antenna is increased, the required calculation complexity is also increased accordingly. Therefore, how to solve the problem of the calculation complexity in de-mapping symbols and meanwhile achieve better performance is one of the important issues of the current multi-antenna communication development.

SUMMARY OF THE INVENTION

The present invention is directed to provide a method for de-mapping symbols in a Multi-Input Multi-Output (MIMO) communication system, in which only a few detected value sets are calculated and a better estimated result is obtained.

The present invention is further directed to provide an apparatus for de-mapping symbols in a MIMO communication system, in which a transmitted data symbol estimation unit is used to calculate a plurality of detected value sets, and the best one is selected to be converted into soft values by a soft value calculation unit, so as to be provided to a channel decoder for performing the soft-decision decoding.

The present invention provides a method for de-mapping symbols in a MIMO communication system, applicable to the MIMO communication system having a plurality of transmitting antennas and a plurality of receiving antennas. In this method, a plurality of received data symbols is received through the receiving antennas, and the received data symbols are obtained by converting a plurality of transmitted data symbols transmitted by the transmitting antennas via a channel effect. Next, the received data symbols are converted by using the estimated channel effect, so as to calculate an estimated value corresponding to one of the transmitted data symbols, and a plurality of constellation points around the estimated value is selected as the detected values of the transmitted data symbol. Then, the detected values of remaining transmitted data symbols are calculated respectively by using the detected values of the transmitted data symbol, so as to obtain a plurality of detected value sets of the transmitted data symbols. Finally, the detected values of each detected value set are compared with the received data symbols, so as to select the best detected value set as the result of de-mapping the received data symbols.

In another aspect, the present invention provides an apparatus for de-mapping symbols in an MIMO communication system, which includes a transmitted data symbol estimation unit and a detected value set decision unit, and the transmitted data symbol estimation unit further includes a first estimation unit and a plurality of second estimation units. The first estimation unit of the transmitted data symbol estimation unit is used for converting the received data symbols received by the receiving antennas of the MIMO system with the estimated channel effect, so as to calculate an estimated value of one of the transmitted data symbols, and selecting a plurality of constellation points around the estimated value as the detected values of the transmitted data symbol. The second estimation units are respectively coupled to the first estimation unit, and used for calculating the detected values of remaining transmitted data symbols with each of the detected values of the transmitted data symbol, so as to output a plurality of detected value sets for the transmitted data symbols. The detected value set decision unit is coupled to the transmitted data symbol estimation unit, and used for comparing the detected values of each detected value set with the received data symbols, so as to select the best detected value set as the result of de-mapping the received data symbols.

In the present invention, after the estimated value of one of the transmitted data symbols has been calculated, a plurality of constellation points around the estimated value is selected as the detected values of the transmitted data symbol. Then, the detected values of remaining transmitted data symbols are calculated according to the detected values, so as to obtain a plurality of detected value sets. Finally, a best one among the detected value sets is selected as a result of de-mapping the received data symbols. Therefore, a better detected result is obtained, and the computation cost is reduced, which possesses low complexity and high performance.

In order to make the aforementioned and other objects, features and advantages of the present invention comprehensible, embodiments accompanied with figures are described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

In order to alleviate the complexity in de-mapping symbols for the MIMO system and to achieve better performance, the present invention provides a detection method based upon a Successive Interference Cancellation (SIC). Different from estimating a single result in the conventional SIC, the present invention employs a concept of multiple candidates, in which a plurality of detected value sets is calculated, and the best one among them is selected as the final detection result, thereby increasing the estimation performance. To make the content of the present invention be more comprehensible, embodiments are recited below as the examples for implementing the present invention.

Figure 2:
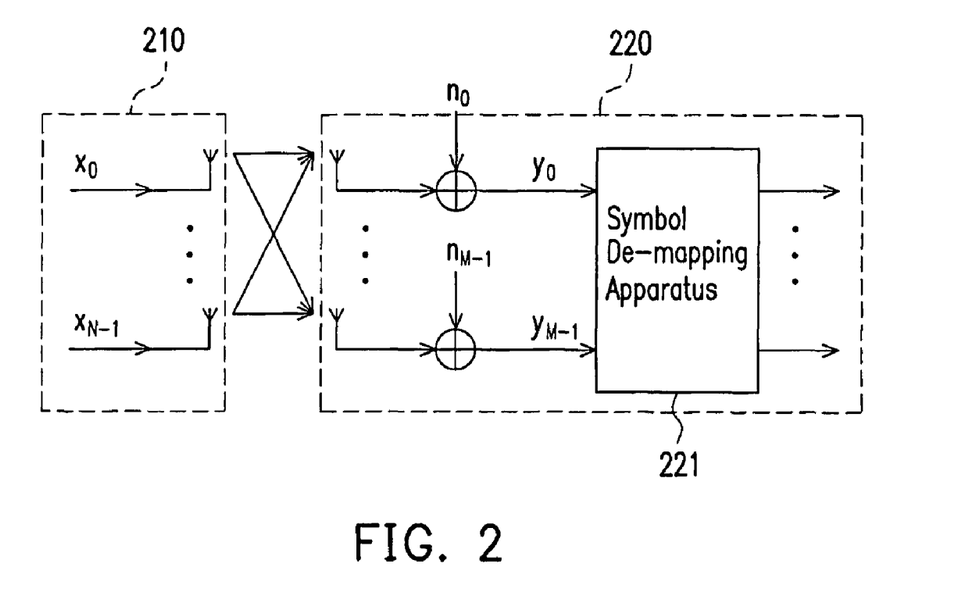
FIG. 2 is a schematic view of a MIMO communication system model according to an embodiment of the present invention.

FIG. 2 is a schematic view of a MIMO communication system model according to an embodiment of the present invention. Referring to FIG. 2, a transmitting end 210 of this model has N transmitting antennas, and a receiving end 220 has M receiving antennas. The transmitting antennas of the transmitting end 210 respectively transmit data symbols (i.e., $x_i$, i=0, 1, 2, . . . , N−1). The receiving antennas of the receiving end 220 are used to receive data symbols after being mixed via channel effect (i.e., $y_j$, j=0, 1, 2, . . . , M−1). After being added with a noise $n_j$, for example, Additive White Gaussian Noise (AWGN), the received data symbols are sent to an apparatus 221 for de-mapping symbols for estimating the detected values of the transmitted data symbols.

Figure 3:
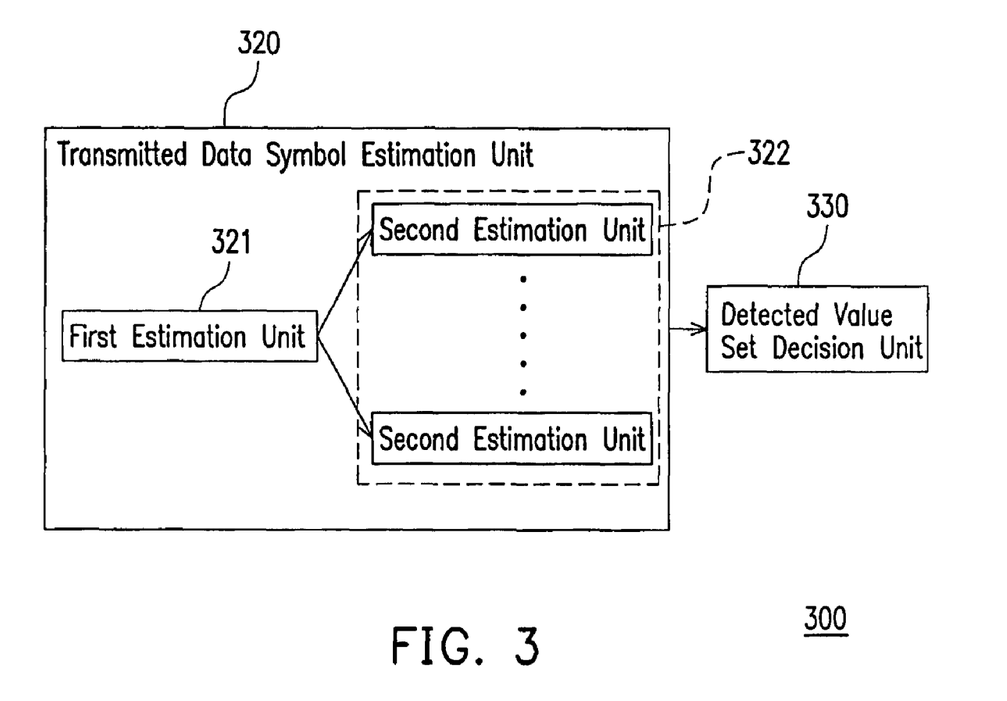
FIG. 3 is a block diagram of an apparatus for de-mapping symbols in the MIMO communication system according to an embodiment of the present invention.

The above apparatus 221 for de-mapping symbols is further illustrated below. FIG. 3 is a block diagram of an apparatus for de-mapping symbols in the MIMO communication system according to an embodiment of the present invention. Referring to FIG. 3, the apparatus 300 for de-mapping symbols includes a transmitted data symbol estimation unit 320 and a detected value set decision unit 330. The transmitted data symbol estimation unit 320 includes a first estimation unit 321 and a second estimation unit 322.

The transmitted data symbol estimation unit 320 is used to estimate the transmitted data symbols transmitted by each transmitting antennas of the MIMO system according to the received data symbols received by the receiving antennas of the receiving end in the MIMO system. The first estimation unit 321 converts the received data symbols by utilizing the estimated channel effect, so as to calculate an estimated value corresponding to one of the transmitted data symbols, and selects a plurality of constellation points around the estimated value as a plurality of detected values of the transmitted data symbol. The estimated channel effect includes a channel matrix corresponding to the channel effect estimated according to the number of the transmitting antennas and the number of the receiving antennas. Furthermore, the second estimation unit 322 is coupled to the first estimation unit 321, for calculating detected values of remaining transmitted data symbols by using the detected values of the transmitted data symbol, so as to output a plurality of detected value sets of the transmitted data symbols.

The number of the second estimation units 322 depends on the number of the selected constellation points in the first estimation unit 321. For example, if the first estimation unit 321 selects four constellation points, four second estimation units 322 are disposed for calculating four detected value sets respectively according to each constellation point.

The detected value set decision unit 330 is coupled to the transmitted data symbol estimation unit 320, for respectively comparing the detected values of a plurality of detected value sets with the received data symbols, and selecting the best detected value set as a result of de-mapping the received data symbols. Taking four detected value sets as an example, the four detected value sets are respectively compared with the received data symbols and the best detected value set is selected.

Figure 4:
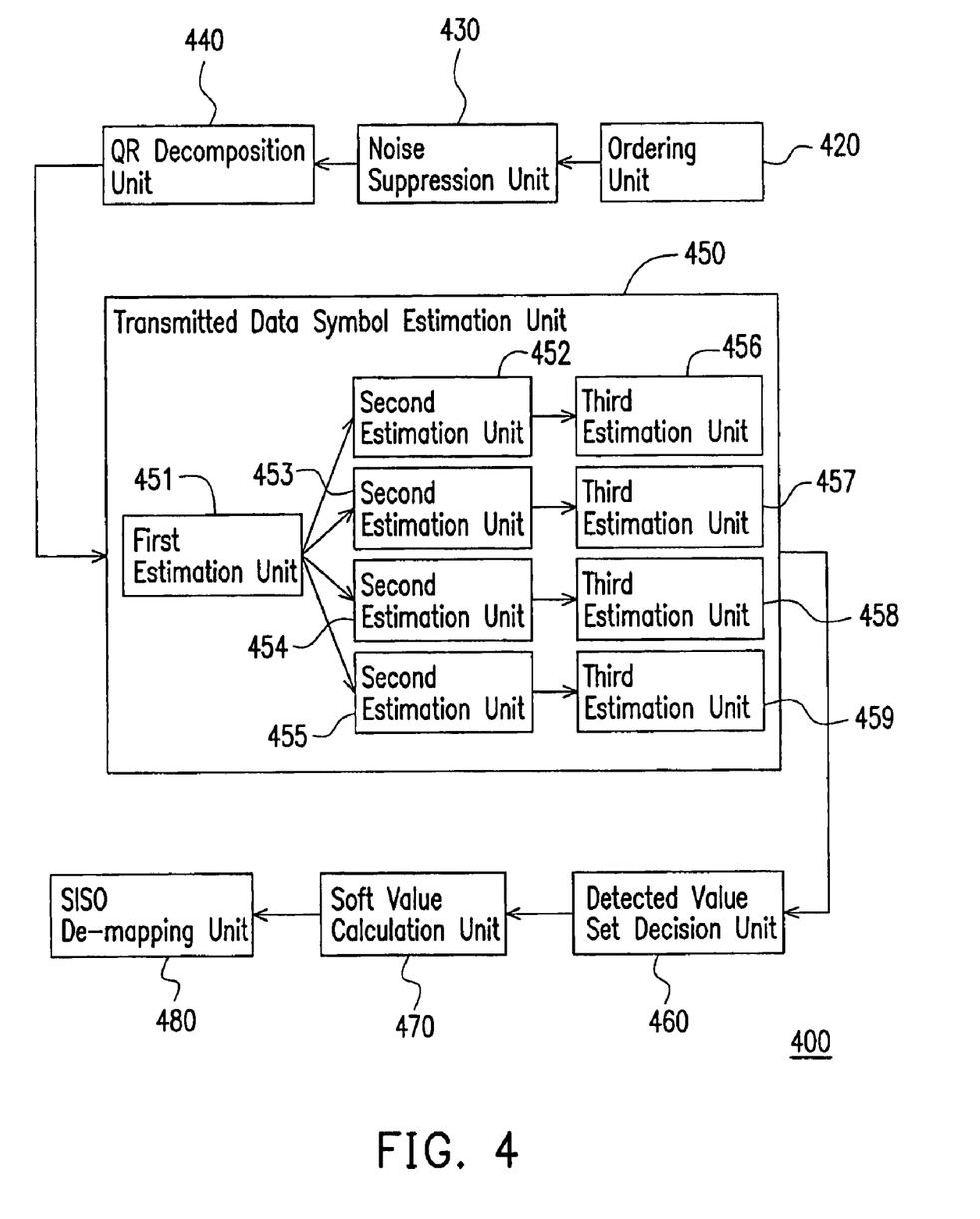
FIG. 4 is a block diagram of an apparatus for de-mapping symbols in the MIMO communication system according to another embodiment of the present invention.

Other components of the apparatus 221 for de-mapping symbols are further illustrated below in detail. FIG. 4 is a block diagram of an apparatus for de-mapping symbols in the MIMO communication system according to another embodiment of the present invention. Referring to FIG. 4, the apparatus 400 for de-mapping symbols includes an ordering unit 420, a noise suppression unit 430, a QR decomposition unit 440, a transmitted data symbol estimation unit 450, a detected value set decision unit 460, a soft value calculation unit 470, and an SISO de-mapping unit 480. The function of the detected value set decision unit 460 is similar to or the same as that of the detected value set decision unit 330 in the above embodiment, which thus will not be further described herein any more. It should be noted that the QR decomposition unit 440 in the present embodiment is used as an example. In another embodiment, any kind of orthogonal factorization units and orthogonal factorization algorithms can also be used for decomposition.

The ordering unit 420 is disposed ahead of the transmitted data symbol estimation unit 450, for adjusting the order of calculating the detected values of the transmitted data symbols according to the importance of the transmitted data symbols, so as to obtain the detected value of the most important data symbol. For example, the transmitted data symbol estimation unit 450 firstly calculates an estimated value, and then selects a plurality of constellation points around the estimated value for estimating a plurality of detected value sets respectively. If the first detected value has a high error rate, the subsequent detected values also have a high error rate. Therefore, the order of calculating the detected values for the transmitted data symbols is adjusted through the ordering unit 420 in this embodiment, so as to reduce the error rate.

The noise suppression unit 430 is disposed between the ordering unit 420 and the QR decomposition unit 440, for adding noise into the channel matrix, so as to reduce the noise interference in the subsequent calculations.

The QR decomposition unit 440 is disposed between the noise suppression unit 430 and the transmitted data symbol estimation unit 450, for decomposing the channel matrix passing through the noise suppression unit 430 into an orthogonal matrix and an upper triangular matrix.

The transmitted data symbol estimation unit 450 is similar to the above transmitted data symbol estimation unit 320 in terms of functions, but the only difference lies in that, the transmitted data symbol estimation unit 450 in this embodiment includes a first estimation unit 451, second estimation units 452-455, and third estimation units 456-459. For convenient illustration, the first estimation unit 451 selects merely four constellation points as the detected values, such that four second estimation units 452-455 are disposed correspondingly.

The third estimation units 456-459 are respectively coupled to the second estimation units 452-455, for calculating an estimated value of another transmitted data symbol by using the previously calculated detected values of the transmitted data symbol, and selecting constellation points around the estimated value of the another transmitted data symbol as the detected values for the another transmitted data symbol. That is to say, supposing there are four transmitting antennas, the detected values of four transmitted data symbols must be estimated. When the estimated value of the first transmitted data symbol is calculated, four constellation points around the estimated value are selected, and then, the second estimation units 452-455 respectively calculate the four estimated values of the second transmitted data symbols according to the four constellation points. Similarly, the constellation points around the four estimated values are selected, and the number of the third estimation units 456-459 also depends on the number of the constellation points correspondingly selected by the second estimation units 452-455. For example, four second estimation units 452-455 respectively select one constellation point, and thus, the third estimation units 456-459 are respectively disposed corresponding to each of the second estimation units 452-455, and so forth.

It should be noted that, the number of the disposed estimation units depends on the number of the selected constellation points in this embodiment, besides the above second estimation units 452-455 and the third estimation units 456-459, fourth estimation units or additional estimation units (not shown) can be further disposed as desired. Particularly, in this embodiment, the first estimation unit 451 selects four constellation points, such that four second estimation units 452-455 are disposed corresponding to the first estimation unit 451. If each of the second estimation units 452-455 also selects four constellation points, four third estimation units 456, four third estimation units 457, four third estimation units 458, and four third estimation units 459 are disposed corresponding to each second estimation unit 452-455 as desired, and other estimation units (not shown) can be disposed similarly.

Additionally, the detected values selected by the detected value set decision unit 460 to serve as the result of de-mapping the received data symbols are hard decision values of the transmitted data symbols. However, during the final decoding process, the hard decision values must be converted to bit soft values, and thus, the soft value calculation unit 470 and the SISO de-mapping unit 480 are further disposed in the present invention to solve this problem.

The soft value calculation unit 470 is coupled to the detected value set decision unit 460, for converting the hard decision values of the transmitted data symbols into symbol soft values. The SISO de-mapping unit 480 is coupled to the soft value calculation unit 470, for de-mapping the symbol soft values into bit soft values.

Figure 5:
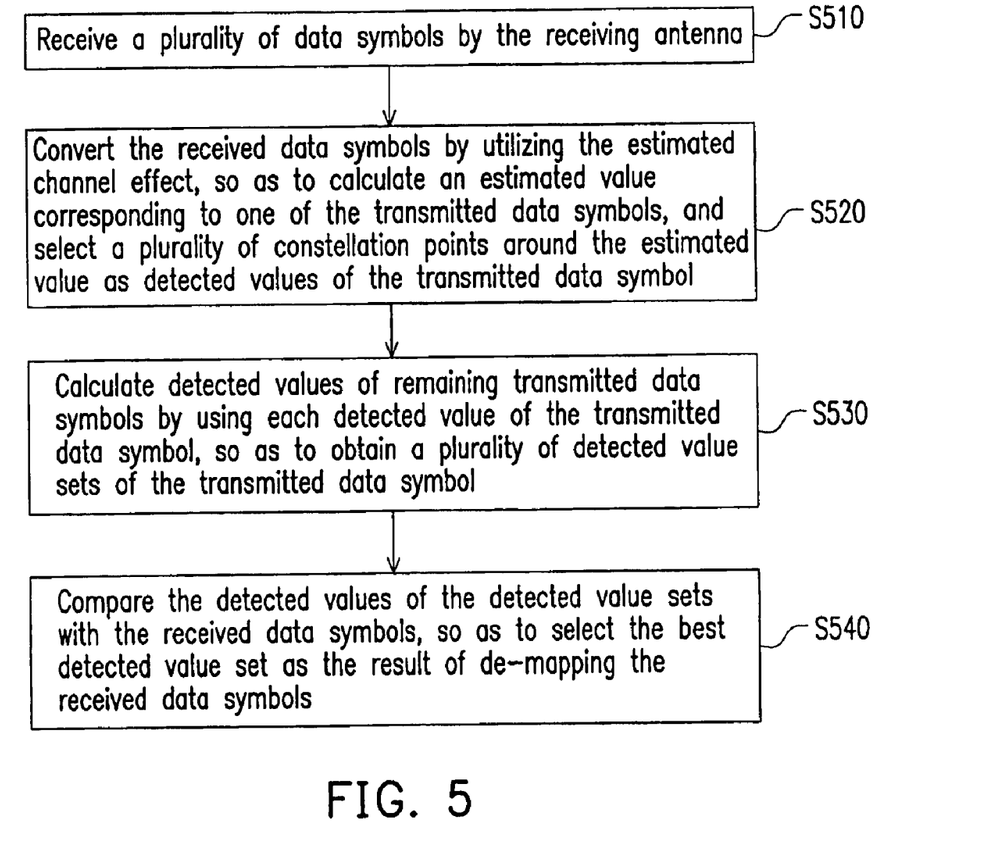
FIG. 5 is a flow chart of a method for de-mapping symbols in the MIMO communication system according to an embodiment of the present invention.

In order to clearly explain the above concepts, each step of the method for de-mapping symbols of the present invention is further describe below together with the above apparatus 400 for de-mapping symbols. FIG. 5 is a flow chart of a method for de-mapping symbols in the MIMO communication system according to an embodiment of the present invention. Referring to both FIGS. 4 and 5, first, as shown in Step S510, a plurality of received data symbols is received by the receiving antennas, and the received data symbols are formed by converting a plurality of transmitted data symbols transmitted by the transmitting antennas via the channel effect.

The channel effect includes a channel matrix $H_{M \times N}$ corresponding to the channel effect estimated according to the number of the transmitting antennas N and the number of the receiving antennas M, where M, N are positive integers, and the equation is listed below:

$$y = \hat{H}x + n \quad (1),$$

in which $\hat{H}$ indicates the estimated channel matrix, and the dimension of the channel matrix can be known as M×N from the number of the transmitting antennas N and the number of the receiving antennas M; y is a M×1 vector, and elements in the vector y represent the received data symbols (i.e., $y_{0,1}, \ldots, _{M-1}$) received by each of the receiving antennas; x is a N×1 vector, and elements in the vector x represent the transmitted data symbols (i.e., $x_{0,1}, \ldots, _{N-1}$) transmitted by each of the transmitting antennas; and n is a M×1 noise vector, for example, Additive White Gaussian Noise (AWGN).

It should be noted that, after Step S510, the ordering unit 420 is used to adjust the order of calculating the detected values of the transmitted data symbols according to the importance of the transmitted data symbols, so as to obtain the detected value of the most important transmitted data symbol.

That is to say, since the order of the elements of the vector x (i.e., the transmitted data symbols) influences the estimation accuracy, the ordering unit 420 is used to reorder the vector x so as to enhance the estimation accuracy. Accordingly, the channel matrix $\hat{H}$ is also reordered as the vector x is recorded, and after being reordered, they are indicated as $\hat{H}'$ and x', and the equation (1) is redefined as:

$$y = \hat{H}'x' + n \quad (2).$$

Next, in Step S520, the estimated channel effect is utilized to convert the received data symbols, so as to calculate an estimated value corresponding to one of the transmitted data symbols, and a plurality of constellation points around the estimated value is selected as the detected values of the transmitted data symbols.

Particularly, first, the QR decomposition unit 440 is used to decompose the channel matrix into the orthogonal matrix and the upper triangular matrix through the QR decomposition algorithm. Next, the result of multiplying the upper triangular matrix by the detected values of the transmitted data symbols is made to be equal to the result of multiplying the Hermitian transpose matrix of the orthogonal matrix by the received data symbols, so as to obtain a plurality of estimation equations. Then, one estimation equation that merely includes the detected value of a single transmitted data symbol is selected from the estimation equations, so as to calculate an estimated value of the transmitted data symbol. Finally, a plurality of constellation points around the estimated value of the transmitted data symbol is selected as the detected values of the transmitted data symbol.

For example, in view of the above Equation (2), the channel matrix $\hat{H}'$ can be decomposed as a product of multiplying the orthogonal matrix Q by the upper triangular matrix R, which is defined as follows:

$$\hat{H}' = QR \quad (3),$$

where Q is a M×N orthogonal matrix, R is a N×N upper triangular matrix. The following equation is obtained by substituting Equation (3) into Equation (2):

$$y = \hat{H}'x' + n,$$
$$\Rightarrow y = QRx' + n,$$
$$\Rightarrow Q^H y = Q^H QRx' + Q^H n,$$
$$\Rightarrow \hat{y} = Rx' + n' \quad (4),$$

where $Q^H$ is a Hermitian transpose matrix of Q.

Furthermore, since noise may be amplified by using the ZF algorithm, the present invention further includes using the noise suppression unit 430 to add noises into the channel matrix through the Minimum Mean Squared Error (MMSE) algorithm, and decomposing the channel matrix into the orthogonal matrix and the upper triangular matrix, and thus eliminating the possibility that the noise is amplified. The operation equation is shown as follows:

$$\begin{bmatrix} \hat{H}' \\ \sigma I \end{bmatrix} = \begin{bmatrix} Q_1 \\ Q_2 \end{bmatrix} R = QR, \quad (5)$$
$$y = Q_1 Rx' + n,$$
$$\Rightarrow Q_1^H y = Q_1^H Q_1 Rx' + Q_1^H n.$$

where σ indicates the square root of the noise variance. Through utilizing the above MMSE algorithm, the noise interference during the calculation processes can be reduced.

After the channel matrix $\hat{H}'$ has been simplified into the orthogonal matrix Q and the upper triangular matrix R, the last row vector of the upper triangular matrix R merely has only one element that is not 0, in this way, one element in the vector x' can be calculated (i.e., an estimated value of a transmitted data symbol in the transmitting end), and further substituting the result back to the Equation (4), so as to calculate the remaining elements of the vector x' (i.e., remaining transmitted data symbols).

Referring to FIGS. 4 and 5, in Step S530, the transmitted data symbol estimation unit 450 calculates detected values of remaining transmitted data symbols by respectively using each detected value of the transmitted data symbol, so as to obtain a plurality of detected value sets of the transmitted data symbols.

For example, as for the 4×4 MIMO system, the transmitted data symbols x' and the received data symbols $\hat{y}$ are substituted into Equation (4):

$$\begin{bmatrix} \hat{y}_0 \\ \hat{y}_1 \\ \hat{y}_2 \\ \hat{y}_3 \end{bmatrix} \begin{bmatrix} R_{00} & R_{01} & R_{02} & R_{03} \\ 0 & R_{11} & R_{12} & R_{13} \\ 0 & 0 & R_{22} & R_{23} \\ 0 & 0 & 0 & R_{33} \end{bmatrix} \begin{bmatrix} x'_0 \\ x'_1 \\ x'_2 \\ x'_3 \end{bmatrix} + \begin{bmatrix} n'_0 \\ n'_1 \\ n'_2 \\ n'_3 \end{bmatrix}. \quad (6)$$

A plurality of estimation equations can be obtained from Equation (6), and it can be known from the estimation equations that the element $x'_3$ is the first obtained element in the vector x' (i.e., the estimated value of a transmitted data symbol in the transmitting end), and the calculation process is listed below:

$$\hat{y}_3 = R_{33}x'_3 + n'_3, \quad (7)$$
$$\Rightarrow x'_3 = \frac{\hat{y}_3 - n'_3}{R_{33}},$$

$$\hat{x}_3 = \text{slicing}\left(\frac{\hat{y}_3}{R_{33}}\right). \quad (8)$$

When the element $x'_3$ (the estimated value) is obtained from Equation (7), Equation (8) is used for performing hard decision, so as to obtain a detected value $\hat{x}_3$ of the element $x'_3$, the detected value $\hat{x}_3$ is the point that is closest to the element $x'_3$ in the modulation signal distribution diagram (or constellation diagram). Then, the detected value $\hat{x}_3$ is substituted back to Equation (6), so as to obtain the element x'2, the element $x'_1$, the element $x'_0$ subsequently (i.e., the remaining transmitted data symbols). For example, substitute the above detected value $\hat{x}_3$ back to Equation (6), and thus the detected value $\hat{x}_2$ of the element $x'_2$ is obtained:

$$\hat{y}_2 = R_{22}x'_2 + R_{23}\hat{x}_3 + n'_2, \quad (9)$$
$$\Rightarrow x'_2 = \frac{\hat{y}_2 - R_{23}\hat{x}_3 - n'_2}{R_{22}},$$

$$\hat{x}_2 = \text{slicing}\left(\frac{\hat{y}_2 - R_{23}\hat{x}_3}{R_{22}}\right). \quad (10)$$

The rest can be deduced by analog, and the remaining detected values $\hat{x}_1$, $\hat{x}_0$ can be calculated. The back-substitution is, for example, Successive Interference Cancellation (SIC).

It should be noted that, although a detected value set can be obtained through the above process, however, if deviation or error occurs in the calculation of a certain detected value, the whole detected value set will be incorrect. Therefore, in another embodiment of the present invention, it further includes selecting a plurality of constellation points $\hat{x}_{3,i}$ (i is a positive integer) around the element $x'_3$ in the modulation signal distribution diagram, so as to respectively calculate a plurality of detected value sets, and thereby increasing the estimation correctness. It is further illustrated below with the element $x'_3$ as an example.

Figure 6:
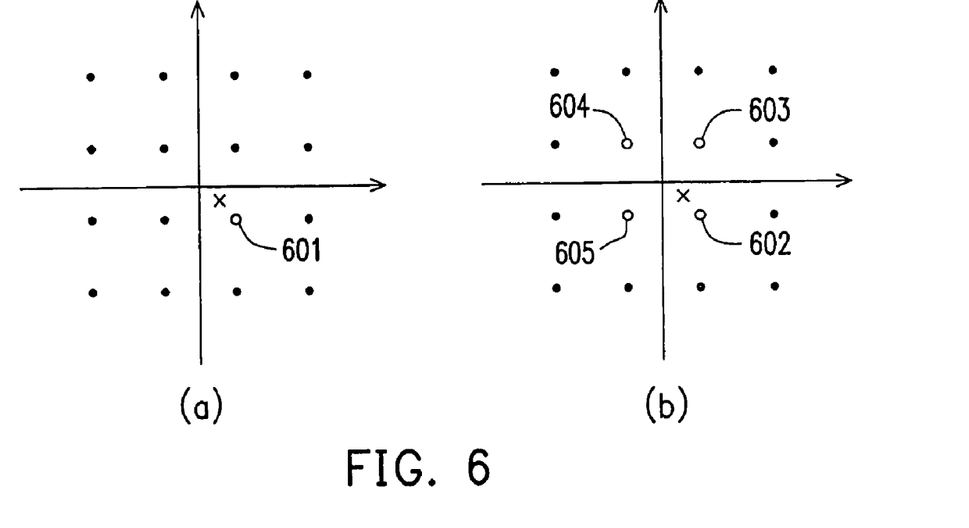
FIG. 6 is a modulation signal distribution diagram according to an embodiment of the present invention.

FIG. 6 is a modulation signal distribution diagram according to an embodiment of the present invention. Referring to FIG. 6, FIGS. 6(a) and 6(b) are modulation signal distribution diagrams of the 16 Quadrature Amplitude Modulation (QAM), in which Y-coordinates represent an orthogonal component and X-coordinates represent an in-phase component. "x" in the figure shows the position of the element X'3 in the modulation signal distribution diagram.

Referring to FIG. 6(a), the constellation point 601 at the lower right of "x" (i.e., the element $x'_3$) is the detected value $\hat{x}_3$ of Equation (8). Then, referring to FIG. 6(b), four constellation points 602-605 around "x" (i.e., 3) are four most possible detected values $\hat{x}_{3,1}$, $\hat{x}_{3,2}$, $\hat{x}_{3,3}$, and $\hat{x}_{3,4}$, and the detected values are respectively substituted back to Equation (6), so as to obtain four detected value sets.

It should be noted that, in Step S540, each detected value of the transmitted data symbol is used to calculate an estimated value corresponding to another transmitted data symbol. Furthermore, constellation points around the estimated value of the another transmitted data symbol are selected as detected values of the another transmitted data symbol. That is to say, a plurality of constellation points can be further selected for the elements $x'_2$, $x'_1$, and $x'_0$, so as to increase the correctness. The process of selecting a plurality of constellation points is illustrated below by taking the 4×4 MIMO communication system as an example.

Figure 7:
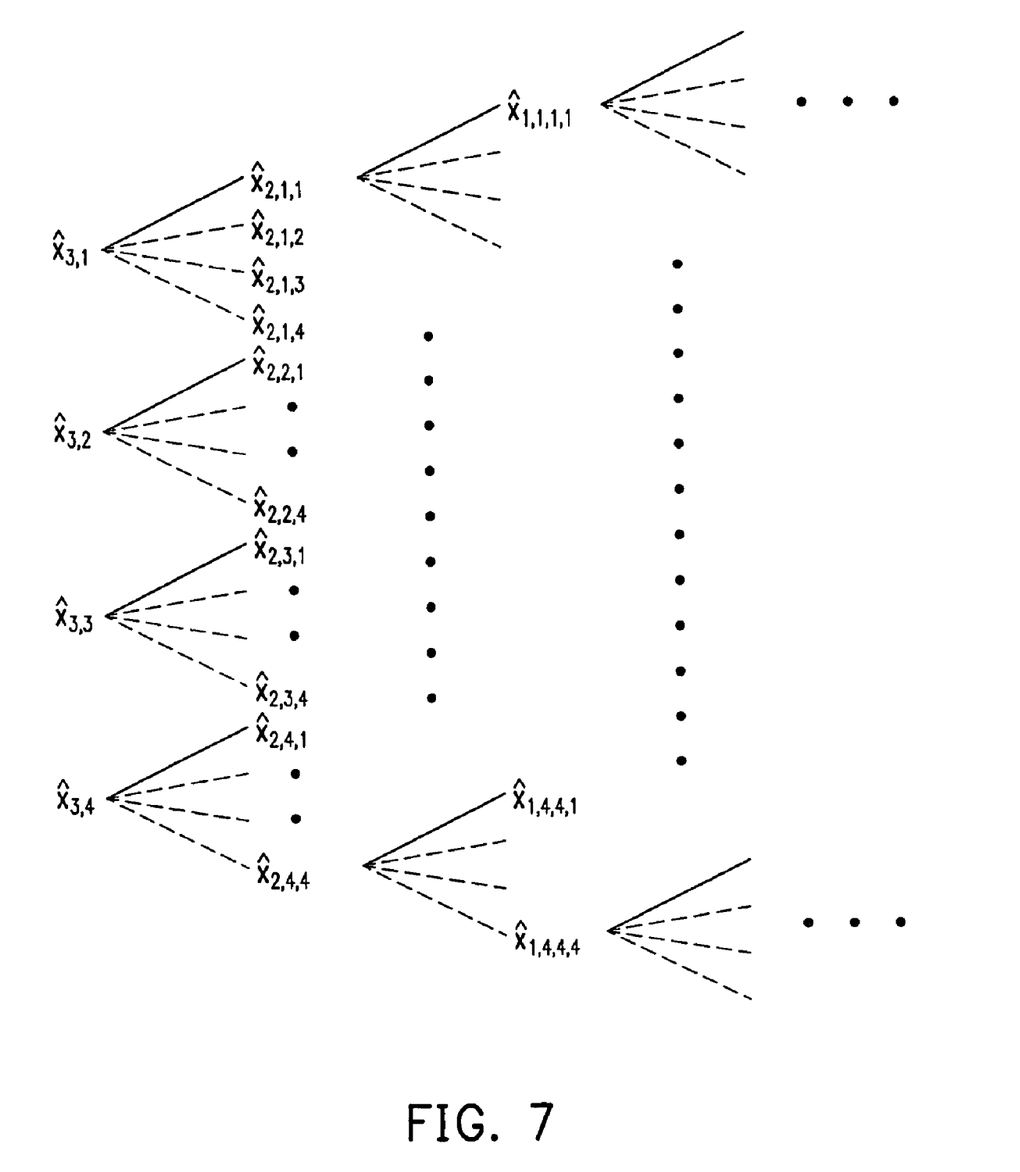
FIG. 7 is a schematic view of a plurality of constellation points according to an embodiment of the present invention.

FIG. 7 is a schematic view of a plurality of constellation points according to an embodiment of the present invention. Referring to FIG. 7, firstly, directed to the obtained first element $x'_3$ (i.e., the estimated value obtained in the first estimation unit 451), four possible detected values $\hat{x}_{3,1}$, $\hat{x}_{3,2}$, $\hat{x}_{3,3}$, $\hat{x}_{3,4}$ around $x'_3$ are selected. Next, the detected value $\hat{x}_{3,1}$ is substituted back to Equation (6) to calculate $x'_{2,1}$ (i.e., the estimated value obtained in the second estimation unit 452), and similarly, four possible detected values $\hat{x}_{2,1,1}$, $\hat{x}_{2,1,2}$, $\hat{x}_{2,1,3}$, $\hat{x}_{2,1,4}$ around $x'_{2,1}$ are selected. At this time, four third estimation units 456 are disposed corresponding to the detected values $\hat{x}_{2,1,1}$, $\hat{x}_{2,1,2}$, $\hat{x}_{2,1,3}$, and $\hat{x}_{2,1,4}$ respectively, and thereby calculating other detected values. Similarly, the detected values $\hat{x}_{3,2}$, $\hat{x}_{3,3}$, and $\hat{x}_{3,4}$ are substituted back to Equation (6) so as to calculate $x'_{2,2,j}$, $x'_{2,3,j}$, and $x'_{2,4,j}$ (j=1-4) respectively, and at this time, the 16(4×4) sets of estimation results are obtained. If four possible detected values are selected for the elements $x'_1$ and $x'_0$ respectively, 256 sets of estimation results are finally obtained. However, the above number of the detected values is taken as an example for the convenience of illustration here, and the number of the possible detected values can be selected depends upon the users' requirements, which is not specifically limited herein.

Referring to FIGS. 4 and 5, in Step S540, the detected values of the detected value sets are compared with the received data symbols by the detected value set decision unit 460, so as to select the best detected value set as the result of de-mapping the received data symbols. For example, the distances between each detected value set and the received data symbols are calculated, so as to select the detected value set with the smallest distance.

Particularly, the detected value set decision unit 460 is used to respectively calculate a sum of distance by subtracting a result of multiplying the detected values of each detected value set by the upper triangular matrix from a result of multiplying the Hermitian transpose matrix of the orthogonal matrix by the actually received data symbols, and the calculation equation is listed below:

$$x = \underset{\hat{x}}{\arg\min} \|\hat{y} - R\hat{x}\|^2. \quad (11)$$

Alternatively, the detected value set decision unit 460 is used to respectively calculate a sum of distance by subtracting a result of multiplying the detected values of each detected value set by the channel matrix from the actually received data symbols, and the calculation equation is listed below:

$$x = \underset{\hat{x}}{\arg\min} \|y - \hat{H}'\hat{x}\|^2. \quad (12)$$

After the sum of distance for each detected value set has been calculated according to Equations (11) or (12), the detected value set with the smallest sum of distance is selected as the result of de-mapping the received data symbols.

It should be noted that, the detected values selected according to the above equations all belong to hard decision values, and the soft-decision decoding cannot be performed until the hard decision values are converted into bit soft values. Therefore, the present invention further includes a method of converting the hard decision values into the soft values, in which the soft value calculation unit 470 is firstly used to convert the hard decision values of the transmitted data symbols into symbol soft values; then, the SISO demapper is used to demap the symbol soft values into bit soft values. The equations for converting the hard decision values of the transmitted data symbols into symbol soft values are listed below:

$$x_{j,soft} = \frac{\hat{h}_j'^T y'}{\|\hat{h}_j'\|^2}, \ j = 0, 1, \ldots, N-1, \quad (13)$$

$$y' = y - \sum_{i=0}^{j-1} \hat{h}_i' x_i' - \sum_{i=j+1}^{N-1} \hat{h}_i' x_i', \quad (14)$$

in which, $x_{j,soft}$ indicates the symbol soft value of the transmitted data symbol, $\hat{h}'$ indicates a column vector of the channel matrix $H_{M \times N}$, y indicates the received data symbol, x' indicates the hard decision value of the transmitted data symbol, and N is the number of the transmitting antennas.

For example, as for the 4×4 MIMO communication system, Equation (2) can be rewritten as follows:

$$y = \hat{h}_0' x_0' + \hat{h}_1' x_1' + \hat{h}_2' x_2' + \hat{h}_3' x_3' + n. \quad (15)$$

in which $\hat{h}_{0-3}'$ indicates the column vector of the channel matrix $\hat{H}'$, such as $\hat{h}_0' = [\hat{h}_{00}' \ \hat{h}_{01}' \ \hat{h}_{02}' \ \hat{h}_{03}']^T$, and so forth. The following equation is obtained if Equation (15) is expanded.

$$\begin{bmatrix} y_0 \\ y_1 \\ y_2 \\ y_3 \end{bmatrix} = \begin{bmatrix} \hat{h}_{00}' \hat{h}_{10}' \hat{h}_{20}' \hat{h}_{30}' \\ \hat{h}_{01}' \hat{h}_{11}' \hat{h}_{21}' \hat{h}_{31}' \\ \hat{h}_{02}' \hat{h}_{12}' \hat{h}_{22}' \hat{h}_{32}' \\ \hat{h}_{03}' \hat{h}_{13}' \hat{h}_{23}' \hat{h}_{33}' \end{bmatrix} \begin{bmatrix} x_0' \\ x_1' \\ x_2' \\ x_3' \end{bmatrix} + n. \quad (16)$$

Therefore, the symbol soft values of the detected value sets can be calculated by utilizing Equation (13). Supposing the finally obtained best detected value set is $(\hat{x}_0, \hat{x}_1, \hat{x}_2, \hat{x}_3)$, when calculating the symbol soft value $x'_{0,soft}$ of the detected value $\hat{x}_0$, the symbol soft value $x'_{0,soft}$ (not known) and the detected values $\hat{x}_1, \hat{x}_2, \hat{x}_3$ are substituted into Equation (15), and the following equation is obtained.

$$\hat{h}_0' x'_{0,soft} = y - \hat{h}_1' \hat{x}_1 - \hat{h}_2' \hat{x}_2 - \hat{h}_3' \hat{x}_3 = y', \quad (17)$$

The following equation can be obtained after further calculations through Equation (17):

$$\frac{\hat{h}_0'^T \hat{h}_0' x'_{0,soft}}{\|\hat{h}_0'\|^2} = x'_{0,soft} = \frac{\hat{h}_0'^T y'}{\|\hat{h}_0'\|^2}, \quad (18)$$

where $\hat{h}_0'^T$ is a transposed matrix of $\hat{h}_0'$. Therefore, the symbol soft value $x'_{0,soft}$ of the detected value $\hat{x}_0$ can be obtained through Equation (18), and remaining symbol soft values of the detected values can be obtained similarly. After obtaining the symbol soft values of the detected value set, the SISO de-mapping unit is used for de-mapping, so as to obtain the bit soft values.

For example, if the detected values in the best detected value set are 1+i, 1−i, −1+i, −1−i respectively, and each detected value indicates 2 bits, 1+i is corresponding to 11 (i.e., the hard decision value). The calculation of the symbol soft value of 1+i is to calculate the proportion of the reliability. Then, the SISO de-mapping unit 480 is used to convert the symbol soft values into bit soft values. The bit soft values not only provide the detected value of the bit, but also provide the measurement value of estimation reliability.

Figure 8:
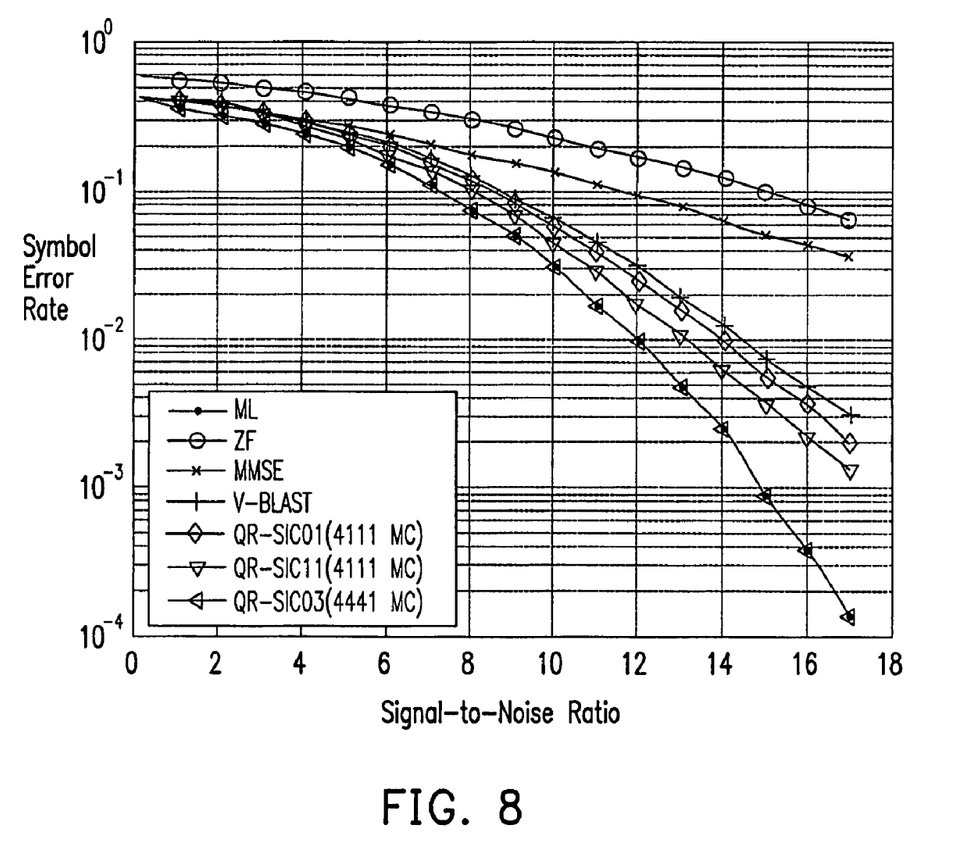
FIG. 8 is a schematic view of experiment results of 4×4 QPSK MIMO communication system according to an embodiment of the present invention.

A diagram of the results for the actual applications implemented according to the above concepts is shown below. FIG. 8 is a schematic view of experiment results of 4×4 QPSK MIMO communication system according to an embodiment of the present invention. Referring to FIG. 8, the vertical axis indicates the Symbol Error Rate (SER) and the horizontal axis indicates the Signal-to-Noise Ratio (SNR). In this embodiment, the conventional detection mechanisms are compared with the method of the present invention. In FIG. 8, the conventional detection mechanisms include Maximum Likelihood (ML) algorithm, ZF algorithm, MMSE algorithm, and V-BLAST algorithm; and the method of the present invention includes "QR-SIC01", "QR-SIC11", and "QR-SIC03".

As for "QR-SIC01(4111 MC)", "MC" indicates Multiple Candidate (MC), "4111" indicates the number of the constellation points, that is, merely four constellation points for the estimated value of the first transmitted data symbol are selected; as for the remaining transmitted data symbols, one constellation point closest to the estimated value is selected.

The signal-to-noise ratio is represented by decibels (dB), and the higher the signal-to-noise ratio is, the higher the signal quality is. Therefore, as known from FIG. 8 that, the experiment results of "QR-SIC" are better than that of the ZF algorithm, the MMSE algorithm, and the V-BLAST algorithm, in which the experiment result of "QR-SIC03 (4441 MC)" is almost approaching that of the ideal ML algorithm.

Figure 9:
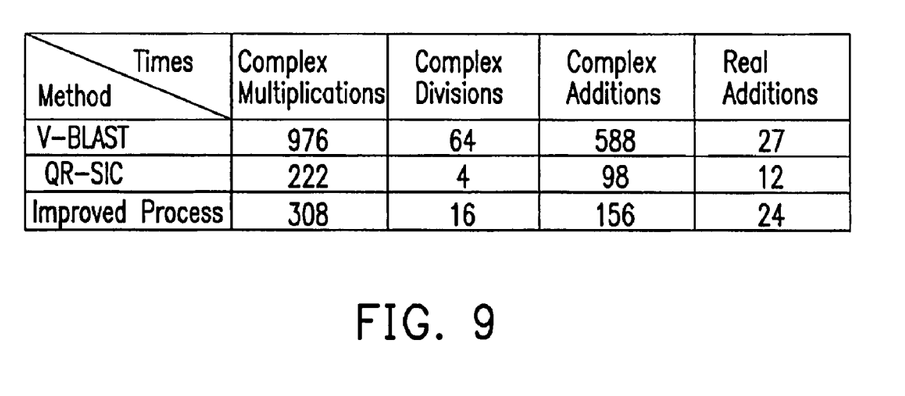
FIG. 9 is a computational complexity comparison table according to an embodiment of the present invention.

Furthermore, FIG. 9 is a complexity comparison table according to an embodiment of the present invention. Referring to FIG. 9, "QR-SIC" indicates the conventional SIC algorithm (estimation for a single result), and "improved process" is, for example, "QR-SIC01 (4111 MC)" algorithm shown in FIG. 8.

As shown in FIG. 9, it can be obviously seen that, the complexity of the algorithm provided in the present invention is slightly higher than that of the conventional "QR-SIC" algorithm, but much lower than that of the ML and V-BLAST algorithms, and the performance of the algorithm provided in the present invention is much better than that of the conventional "QR-SIC" and "V-BLAST" algorithms. In addition, the common SIC detectors or sphere detectors all use the estimation results of hard decision, and are difficult to offer soft values to the channel decoder for performing soft-decision decoding, and thus, the gain is reduced for 2-3 dB. The method for calculating the soft values provided in the present invention can effectively solve the above problem.

To sum up, the method and apparatus for de-mapping symbols in the MIMO communication system according to the present invention at least have the following advantages:

1. In the present invention, merely fewer detected value sets are required to be calculated, and the present invention has a lower computational complexity compared with the algorithms such as ML and V-BLAST.

2. A plurality of detected value sets is calculated, and the best one is selected, such that the estimation accuracy is increased, and the number of the detected value sets for being calculated is adjusted as desired, which is more flexible in application.

3. Before calculating the detected values, the estimation order is reordered according to the importance of the transmitted data symbols, so as to obtain more accurate estimated value, and thereby enhancing the accuracy of the subsequent calculations.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for de-mapping symbols in a Multi-Input Multi-Output (MIMO) communication system, applicable to a MIMO communication system having a plurality of transmitting antennas and a plurality of receiving antennas, comprising:
   receiving a plurality of received data symbols through the receiving antennas, wherein the received data symbols are obtained by converting a plurality of transmitted data symbols transmitted by the transmitting antennas via a channel effect;
   converting the received data symbols by using the channel effect, so as to calculate an estimated value corresponding to one of the transmitted data symbols, and selecting a plurality of constellation points around the estimated value as a plurality of detected values of the transmitted data symbol, comprising:
      decomposing a channel matrix corresponding to the channel effect into an orthogonal matrix and a triangular matrix through an orthogonal factorization algorithm;
      letting a result of multiplying the triangular matrix by the detected values of the transmitted data symbols be equal to a result of multiplying a Hermitian transpose matrix of the orthogonal matrix by the received data symbols, so as to obtain a plurality of estimation equations;
      selecting one estimation equation that merely comprises the detected value of a single transmitted data symbol from the estimation equations, so as to calculate the estimated value of the transmitted data symbol; and
      selecting the constellation points around the estimated value of the transmitted data symbol as the detected value of the transmitted data symbol;
   calculating the detected values of remaining transmitted data symbols by using the detected values of the transmitted data symbol, so as to obtain a plurality of detected value sets for the transmitted data symbols; and
   comparing the detected values of each of the detected value sets with the received data symbols, so as to select a best one among the detected value sets as a result of de-mapping the received data symbols.

2. The method for de-mapping symbols in a multi-antenna communication system as claimed in claim 1, wherein the channel matrix comprises a channel matrix $H_{m \times N}$ corresponding to the channel effect estimated according to the number of the transmitting antennas N and the number of the receiving antennas M, wherein M, N are positive integers.

3. The method for de-mapping symbols in a multi-antenna communication system as claimed in claim 2, wherein the step of converting the received data symbols by using the channel effect to calculate an estimated value corresponding to one of the transmitted data symbols, and selecting a plurality of constellation points around the estimated value as a plurality of detected values of the transmitted data symbol comprises:
   decomposing the channel matrix $H_{M \times N}$ into an orthogonal matrix $Q_{M \times N}$ and a triangular matrix $R_{N \times N}$ through an orthogonal factorization algorithm;
   letting a result of multiplying the triangular matrix by the detected values of the transmitted data symbols be equal to a result of multiplying a Hermitian transpose matrix of the orthogonal matrix by the received data symbols, so as to obtain a plurality of estimation equations;
   selecting one estimation equation that merely comprises the detected value of a single transmitted data symbol from the estimation equations, so as to calculate the estimated value of the transmitted data symbol; and
   selecting the constellation points around the estimated value of the transmitted data symbol as the detected value of the transmitted data symbol.

4. The method for de-mapping symbols in a multi-antenna communication system as claimed in claim 3, wherein the orthogonal factorization algorithm comprises a QR decomposition algorithm and the channel matrix $H_{M \times N}$ comprises being decomposed into an orthogonal matrix $Q_{M \times N}$ and an upper triangular matrix $R_{N \times N}$.

5. The method for de-mapping symbols in a multi-antenna communication system as claimed in claim 3, after the step of receiving the received data symbols, the method further comprises:
   adjusting the order of calculating the detected values of the transmitted data symbols according to the importance of the transmitted data symbols, so as to obtain the detected values of the most important transmitted data symbol.

6. The method for de-mapping symbols in a multi-antenna communication system as claimed in claim 5, wherein the importance of the transmitted data symbols includes energy of the transmitted data symbols.

7. The method for de-mapping symbols in a multi-antenna communication system as claimed in claim 4, wherein the step of decomposing the channel matrix $H_{M \times N}$ into the orthogonal matrix $Q_{M \times N}$ and the upper triangular matrix $R_{M \times N}$ further comprises:
   adding noises into the channel matrix $H_{M \times N}$ through a Minimum Mean Squared Error (MMSE) algorithm, and decomposing the extended channel matrix $H_{M \times N}$ into the orthogonal matrix $Q_{M \times N}$ and the upper triangular matrix $R_{N \times N}$ so as to reduce noise interference.

8. The method for de-mapping symbols in a multi-antenna communication system as claimed in claim 4, wherein the step of comparing the detected values of each of the detected value sets with the received data symbols to select a best one among the detected value sets as a result of de-mapping the received data symbols comprises:
   respectively calculating a sum of distance by subtracting a result of multiplying the detected values of each of the detected value sets by the upper triangular matrix from a result of multiplying the Hermitian transpose matrix of the orthogonal matrix by the actually received data symbols; and
   selecting the detected value set with the smallest sum of distance as a result of de-mapping the received data symbols.

9. The method for de-mapping symbols in a multi-antenna communication system as claimed in claim 4, wherein the step of comparing the detected values of each of the detected value sets with the received data symbols to select a best one among the detected value sets as a result of de-mapping the received data symbols comprises:

respectively calculating a sum of distance by subtracting a result of multiplying the detected values of each of the detected value sets by the channel matrix from the actually received data symbols; and selecting the detected value set with the smallest sum of distance as a result of de-mapping the received data symbols.

10. The method for de-mapping symbols in a multi-antenna communication system as claimed in claim 1, wherein the step of calculating the detected values of remaining transmitted data symbols by utilizing each of the detected values of the transmitted data symbol comprises:

calculating the estimated value corresponding to another transmitted data symbol by utilizing each of the detected values of the transmitted data symbol; and selecting a plurality of constellation points around the estimated value of the another transmitted data symbol as the detected values of the another transmitted data symbol.

11. The method for de-mapping symbols in a multi-antenna communication system as claimed in claim 1, wherein the detected values as the result of de-mapping the received data symbols are a plurality of hard decision values of the transmitted data symbols.

12. The method for de-mapping symbols in a multi-antenna communication system as claimed in claim 11, further comprising:

converting the hard decision values of the transmitted data symbols into a plurality of symbol soft values; and de-mapping the symbol soft values into a plurality of bit soft values through a Single-Input Single-Output (SISO) demapper.

13. The method for de-mapping symbols in a multi-antenna communication system as claimed in claim 12, wherein the converting of the symbol soft values is at least relevant to one of the channel matrix $H_{M \times N}$ the received data symbols, the hard decision values of the transmitted data symbols, and the number of the transmitting antennas, or a combination thereof.

14. An apparatus for de-mapping symbols in a Multi-Input Multi-Output (MIMO) communication system, comprising:

a transmitted data symbol estimation unit, comprising:

a first estimation unit, for converting a plurality of received data symbols received by a plurality of receiving antennas of a Multi-Input Multi-Output (MIMO) communication system by using an estimated channel effect, so as to calculate an estimated value corresponding to one of the transmitted data symbols, and selecting a plurality of constellation points around the estimated value as a plurality of detected values of the transmitted data symbol;

a plurality of second estimation units, respectively coupled to the first estimation unit, for respectively calculating the detected values of remaining transmitted data symbols by using each of the detected values of the transmitted data symbol, so as to output a plurality of detected value sets of the transmitted data symbols;

a detected value set decision unit, coupled to the transmitted data symbol estimation unit, for comparing the detected values of each of the detected value sets with the received data symbols, so as to select the best one among the detected value sets as a result of de-mapping the received data symbols; and a QR decomposition unit, disposed ahead of the transmitted data symbol estimation unit, for decomposing the channel matrix into an orthogonal matrix and an upper triangular matrix, wherein the first estimation unit of the transmitted data symbol estimation unit comprises:

letting a result of multiplying the upper triangular matrix by the detected values of the transmitted data symbols be equal to a result of multiplying of the Hermitian transpose matrix of the orthogonal matrix by the received data symbols, so as to obtain a plurality of estimation equations;

selecting one estimation equation that merely comprises the detected value of a single transmitted data symbol from the estimation equations, so as to calculate the estimated value of the transmitted data symbol; and selecting a plurality of constellation points around the estimated value of the transmitted data symbol as the detected values of the transmitted data symbol.

15. The apparatus for de-mapping symbols in a multi-antenna communication system as claimed in claim 14, wherein the estimated channel effect comprises a channel matrix $H_{M \times N}$ corresponding to the channel effect estimated according to the number of the transmitting antennas N and the number of the receiving antennas M, wherein M, N are positive integers.

16. The apparatus for de-mapping symbols in a multi-antenna communication system as claimed in claim 14, further comprising:

an ordering unit, disposed ahead of the transmitted data symbol estimation unit, for adjusting the order of calculating the detected values of the transmitted data symbols according to the importance of the transmitted data symbols, so as to obtain the detected values of the most important transmitted data symbol.

17. The apparatus for de-mapping symbols in a multi-antenna communication system as claimed in claim 14, further comprising:

an orthogonal factorization unit, disposed ahead of the transmitted data symbol estimation unit, for decomposing the channel matrix $H_{M \times N}$ into an orthogonal matrix $Q_{M \times N}$ and a triangular matrix $R_{N \times N}$.

18. The apparatus for de-mapping symbols in a multi-antenna communication system as claimed in claim 14, the QR decomposition unit decomposes an channel matrix $H_{M \times N}$ into an orthogonal matrix $Q_{M \times N}$ and an upper triangular matrix $R_{N \times N}$.

19. The apparatus for de-mapping symbols in a multi-antenna communication system as claimed in claim 18, wherein the first estimation unit of the transmitted data symbol estimation unit comprises:

letting a result of multiplying the upper triangular matrix by the detected values of the transmitted data symbols be equal to a result of multiplying of the Hermitian transpose matrix of the orthogonal matrix by the received data symbols, so as to obtain a plurality of estimation equations;

selecting one estimation equation that merely comprises the detected value of a single transmitted data symbol from the estimation equations, so as to calculate the estimated value of the transmitted data symbol; and selecting a plurality of constellation points around the estimated value of the transmitted data symbol as the detected values of the transmitted data symbol.

20. The apparatus for de-mapping symbols in a multi-antenna communication system as claimed in claim 18, further comprising:

a noise suppression unit, disposed ahead of the QR decomposition unit, for adding noises into the channel matrix $H_{M \times N}$, and sending the channel matrix $H_{M \times N}$ to the QR decomposition unit to be decomposed into the orthogonal matrix $Q_{M \times N}$ and the upper triangular matrix $R_{N \times N}$, so as to reduce the noise interference.

21. The apparatus for de-mapping symbols in a multi-antenna communication system as claimed in claim 14, wherein the detected value set decision unit comprises:

respectively calculating a sum of distance by subtracting a result of multiplying the detected values of each of the detected value sets by the upper triangular matrix from a result of multiplying the Hermitian transpose matrix of the orthogonal matrix by the actually received data symbols; and selecting the detected value set with the smallest sum of distance as a result of de-mapping the received data symbols.

22. The apparatus for de-mapping symbols in a multi-antenna communication system as claimed in claim 14, wherein the detected value set decision unit comprises:

respectively calculating a sum of distance by subtracting a result of multiplying the detected values of each of the detected value sets by the channel matrix from the actually received data symbols; and selecting the detected value set with the smallest sum of distance as a result of de-mapping the received data symbols.

23. The apparatus for de-mapping symbols in a multi-antenna communication system as claimed in claim 14, wherein the transmitted data symbol estimation unit further comprises:

a plurality of third estimation units, coupled to each of the second estimation units, for calculating the estimated value of another transmitted data symbol by using each of the detected values of the transmitted data symbol, and selecting a plurality of constellation points around the estimated value of the another transmitted data symbol as the detected values of the another transmitted data symbol.

24. The apparatus for de-mapping symbols in a multi-antenna communication system as claimed in claim 14, wherein the detected values selected by the detected value set decision unit to serve as the result of de-mapping the received data symbols are a plurality of hard decision values of the transmitted data symbols.

25. The apparatus for de-mapping symbols in a multi-antenna communication system as claimed in claim 24, further comprising:

a soft value calculation unit, coupled to the detected value set decision unit, for converting the hard decision values of the transmitted data symbols into a plurality of symbol soft values.

26. The apparatus for de-mapping symbols in a multi-antenna communication system as claimed in claim 25, further comprising:

a SISO de-mapping unit, coupled to the soft value calculation unit, for de-mapping the symbol soft values into a plurality of bit soft values.

27. The apparatus for de-mapping symbols in a multi-antenna communication system as claimed in claim 25, wherein the converting of the symbol soft values is at least relevant to one of the channel matrix $H_{M \times N}$ the received data symbols, the hard decision values of the transmitted data symbols, and the number of the transmitting antennas, or a combination thereof.

* * * * *